L. T. NICHOLS & H. E. SKEELS.
EGG CRATE.
APPLICATION FILED AUG. 31, 1909.
968,592.
Patented Aug. 30, 1910.
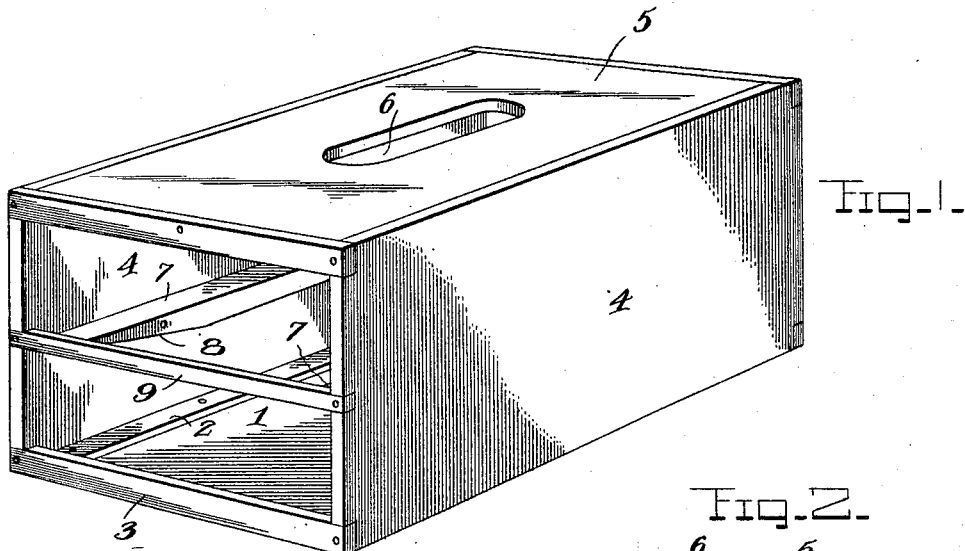
Fig. 1.
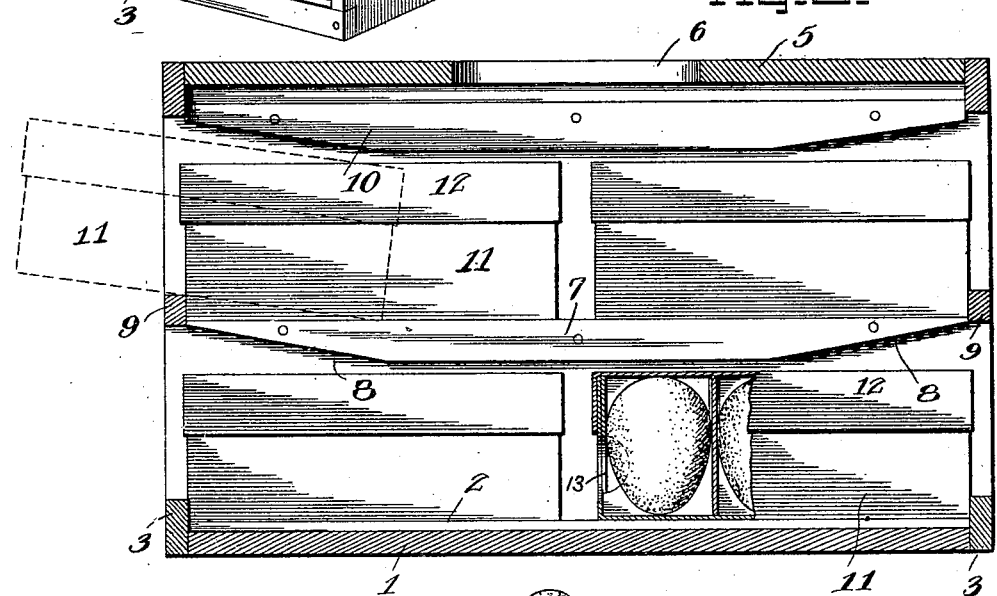
Fig. 2.
Fig. 3.
WITNESSES
W. H. Rockwell
C. K. Reichenbach
Inventors:
L. T. Nichols
Henry E. Skeels,
By William W. Deane,
their attorney.
THE NORRIS PETERS CO., WASHINGTON, D. C.

UNITED STATES PATENT OFFICE.

L T NICHOLS AND HENRY E. SKEELS, OF ROCHESTER, NEW YORK.

EGG-CRATE.

968,592.   Specification of Letters Patent.   Patented Aug. 30, 1910.

Application filed August 31, 1909. Serial No. 515,483.

*To all whom it may concern:*

Be it known that we, L T NICHOLS and HENRY E. SKEELS, citizens of the United States, residing at Rochester, in the county of Monroe and State of New York, have invented certain new and useful Improvements in Egg-Crates, of which the following is a specification.

Our invention relates to egg crates; and it has for its object to provide a crate embodying a simple construction for holding trays against undue vertical movement and casual displacement, while permitting ready removal of the trays upon slight manipulation thereof.

The invention will be fully understood from the following description and claim, read in connection with the accompanying drawings, in which:

Figure 1 is a perspective view showing the crate with the trays removed; Fig. 2, a longitudinal vertical section showing trays in full lines within the crate, dotted lines representing the manner in which the trays are removed and inserted; and Fig. 3, a detail of one of the tray covers.

The crate consists of a bottom 1 having slide rests 2 running lengthwise thereof, and cross cleats or guards 3 which extend above the bottom and above the slide rests 2, sides 4 and a top 5 having a suitable hand hole 6. Preferably, the bottom, sides, and top are solid to give greater strength and protect the eggs.

Extending lengthwise of the crate and connected to the inner faces of the sides 4 thereof are the slide rests 7 whose upper faces are straight and whose under faces are parallel to the bottom of the crate for the greater parts of their length but whose ends are tapered underneath, as at 8, said parts sloping upwardly and outwardly and leading to the under edges of the cross cleats or guards 9 at the ends of the crate. Similar slide rests 10 are secured to the sides 4 adjacent the top 5.

As many of the slide rests and cross bars or cleats may be used as it is desired to provide for additional tiers of egg trays, the crate being made of any desired height.

The egg trays 11 are of the ordinary cellular construction and have removable tops 12 which may be utilized as shown in Fig. 3, to contain the eggs for purposes of display, if desired. Unlike the ordinary egg trays, however, these trays are provided in their opposite sides with finger holes 13 by the insertion of the finger in which the tray may be readily manipulated in placing it within or removing it from the crate. One of the said finger holes 13 is shown in Fig. 2.

The trays are adapted to rest on the slide rests 2 and 7 and to be retained against longitudinal shifting or casual displacement from the crate by the cross cleats 3 and 9 and against vertical shifting by virtue of the juxtaposition of the slide rests 7 and 10 to the tops or covers of said trays and thus rough handling of the crate in transportation does not tend to break the eggs. By the provision of the inclined parts 8, the egg tray can be lifted at its outer end sufficiently high so that its bottom will clear the cross cleats when inserting or removing the tray and when it is once within the crate it is held against endwise and vertical movements as before described.

It will be noted from the foregoing that each pair of slide rests 7 and 10 constitute what may be properly denominated guards, and that the intermediate portions of the said guards serve to prevent undue vertical movement of the trays which are interposed between them and the support below, while the upwardly and outwardly tapered end portions of the guards permit of the trays being raised and withdrawn over the cleats 3, 9, which constitute stops and prevent endwise displacement of the trays when the same rest flat on the support.

The holes 13 afford a convenient means for insertion of the finger when placing the tray in the crate or removing it therefrom.

Having thus described our invention, what we claim as new and desire to secure by Letters Patent, is:—

A crate comprising side walls, a horizontal support, an end stop extending a slight distance above said support, and a guard spaced above the support and having a horizontal intermediate portion and also having an end portion that is inclined upward and outward from the said horizontal portion to the vertical plane of the said end stop.

In testimony whereof we affix our signatures in presence of two witnesses.

L T NICHOLS.
HENRY E. SKEELS.

Witnesses:
T. D. BIDWELL,
L. H. PIERSON.